US00RE47981E

(19) United States
(12) Reissued Patent
Sano

(10) Patent Number: US RE47,981 E
(45) Date of Reissued Patent: *May 12, 2020

(54) INK JET RECORDING METHOD FOR RECORDING PATTERN LAYER AND WHITE OVERLAYING LAYER ON LONGITUDINAL SHEET

(71) Applicant: Seiko Epson Corporation, Tokyo (JP)

(72) Inventor: Tsuyoshi Sano, Shiojiri (JP)

(73) Assignee: Seiko Epson Corporation, Tokyo (JP)

( * ) Notice: This patent is subject to a terminal disclaimer.

(21) Appl. No.: 15/135,867

(22) Filed: Apr. 22, 2016

Related U.S. Patent Documents

Reissue of:
(64) Patent No.: 8,702,222
Issued: Apr. 22, 2014
Appl. No.: 13/707,152
Filed: Dec. 6, 2012

U.S. Applications:
(63) Continuation of application No. 12/231,402, filed on Sep. 2, 2008, now Pat. No. 8,721,062.

(30) Foreign Application Priority Data

Aug. 30, 2007 (JP) ..... 2007-223541

(51) Int. Cl.

| | |
|---|---|
| ***B41J 2/01*** | (2006.01) |
| ***B41J 3/407*** | (2006.01) |
| ***B41J 3/60*** | (2006.01) |
| ***B41J 2/07*** | (2006.01) |
| ***B41M 5/50*** | (2006.01) |
| ***B41J 15/04*** | (2006.01) |

(52) U.S. Cl.
CPC ..... *B41J 3/407* (2013.01); *B41J 2/07* (2013.01); *B41J 3/60* (2013.01); *B41J 15/04* (2013.01); *B41M 5/50* (2013.01); *Y10T 428/24802* (2015.01)

(58) Field of Classification Search
CPC ..... B41J 3/407; B41J 3/60; B41J 15/04; B41J 2/07; B41M 5/50; Y10T 428/24802
USPC ..... 347/100, 101, 95, 96
See application file for complete search history.

(56) References Cited

U.S. PATENT DOCUMENTS

| | | | | |
|---|---|---|---|---|
| 4,089,800 | A | 5/1978 | Temple | |
| 5,568,169 | A * | 10/1996 | Dudek | B41J 2/2107 347/15 |
| 5,764,263 | A | 6/1998 | Lin | |
| 6,428,143 | B2 * | 8/2002 | Irihara | B41J 2/2114 347/100 |
| 6,863,392 | B2 * | 3/2005 | Shimomura et al. | 347/100 |
| 7,168,802 | B2 | 1/2007 | Kondo | |
| 7,244,021 | B2 | 7/2007 | Arai | |

(Continued)

FOREIGN PATENT DOCUMENTS

| | | | |
|---|---|---|---|
| JP | 57-038185 | A | 3/1982 |
| JP | 60-168651 | A | 9/1985 |

(Continued)

*Primary Examiner* — Minh Nguyen
(74) *Attorney, Agent, or Firm* — Nutter McClennen & Fish LLP

(57) ABSTRACT

The present invention relates to an ink jet recording method for recording a white overlaying layer and a non-white pattern layer to a recording medium, printed matters obtained by the recording method, and systems for realizing the recording method thereof.

10 Claims, 2 Drawing Sheets

(56) References Cited

U.S. PATENT DOCUMENTS

| | | | | |
|---|---|---|---|---|
| 8,517,528 | B2 | 8/2013 | Sano | |
| 8,702,222 | B2 | 4/2014 | Sano | |
| 8,721,062 | B2 | 5/2014 | Sano | |
| 2001/0020964 | A1* | 9/2001 | Irihara et al. | 347/43 |
| 2003/0052952 | A1 | 3/2003 | Tanabe et al. | |
| 2003/0142168 | A1* | 7/2003 | Suzuki et al. | 347/21 |
| 2003/0149130 | A1* | 8/2003 | Kondo | 523/160 |
| 2003/0234848 | A1 | 12/2003 | Ishikawa | |
| 2004/0189772 | A1* | 9/2004 | Arai | 347/102 |
| 2005/0237352 | A1* | 10/2005 | Yoneyama | 347/9 |
| 2006/0164487 | A1 | 7/2006 | Kadomatsu et al. | |
| 2007/0279470 | A1 | 12/2007 | Arai | |
| 2009/0081423 | A1 | 3/2009 | Sano | |
| 2012/0287211 | A1 | 11/2012 | Sano | |
| 2013/0135383 | A1 | 5/2013 | Sano | |

FOREIGN PATENT DOCUMENTS

| | | | |
|---|---|---|---|
| JP | 60-171143 | A | 9/1985 |
| JP | 60-232990 | A | 11/1985 |
| JP | 60-234879 | A | 11/1985 |
| JP | 60-245588 | A | 12/1985 |
| JP | 61-074879 | A | 4/1986 |
| JP | 61-132377 | A | 6/1986 |
| JP | 61-134290 | A | 6/1986 |
| JP | 61-181679 | A | 8/1986 |
| JP | 62-184879 | A | 8/1987 |
| JP | 62-220383 | A | 9/1987 |
| JP | 04-214382 | A | 8/1992 |
| JP | 04-282282 | A | 10/1992 |
| JP | 04-285650 | A | 10/1992 |
| JP | 06-199035 | A | 7/1994 |
| JP | 06-237351 | A | 8/1994 |
| JP | 07-082694 | A | 3/1995 |
| JP | 08-218018 | A | 8/1996 |
| JP | 10-203006 | A | 8/1998 |
| JP | 11-129613 | A | 5/1999 |
| JP | 11-138786 | A | 5/1999 |
| JP | 11-140365 | A | 5/1999 |
| JP | 2000-103995 | A | 4/2000 |
| JP | 2001-234093 | A | 8/2001 |
| JP | 2001-328344 | A | 11/2001 |
| JP | 2002-038063 | A | 2/2002 |
| JP | 2002-332433 | A | 11/2002 |
| JP | 2002-348513 | A | 12/2002 |
| JP | 2003-220698 | A | 8/2003 |
| JP | 2003-342505 | A | 12/2003 |
| JP | 2004-018546 | A | 1/2004 |
| JP | 2004-034384 | A | 2/2004 |
| JP | 3562754 | B2 | 9/2004 |
| JP | 2004-306591 | A | 11/2004 |
| JP | 3639479 | B2 | 4/2005 |
| JP | 2005-125690 | A | 5/2005 |
| JP | 2005-126584 | A | 5/2005 |

* cited by examiner

INK JET RECORDING METHOD FOR RECORDING PATTERN LAYER AND WHITE OVERLAYING LAYER ON LONGITUDINAL SHEET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[The entire disclosures of U.S. patent application Ser. No. 12/231,402, filed Sep. 2, 2008, and Japanese Patent Application No. 2007-223541, filed Aug. 30, 2007, are expressly incorporated by reference herein.] *This is an application for reissue of U.S. Pat. No. 8,702,222, which is issued from U.S. application Ser. No. 13/707,152, filed Dec. 6, 2012, which is a continuation of U.S. application Ser. No. 12/231,402 (now U.S. Pat. No. 8,721,062), filed Sep. 2, 2008, which claims the benefit of Japanese Patent Application No. 2007-223541, filed Aug. 30, 2007. These applications, in their entirety, are incorporated herein by reference. A second Reissue application of U.S. Pat. No. 8,702,222, which is issued from U.S. application Ser. No. 13/707,152, filed Dec. 6, 2012, which is a continuation of U.S. application Ser. No. 12/231,402 (now U.S. Pat. No. 8,721,062), filed Sep. 2, 2008, which claims the benefit of Japanese Patent Application No. 2007-223541, filed Aug. 30, 2007, was filed on Apr. 21, 2016, and is now abandoned.*

BACKGROUND

1. Technical Field

The present invention relates to an ink jet recording method for recording a pattern layer (e.g., a color pattern layer, or a black or gray pattern layer) and a white overlaying layer on a longitudinal film base material, and a longitudinal printed matter obtained by the recording method. According to one aspect of the present invention, remote proofing during package printing of such a type that a color image is printed on a white background can precisely be realized by an inexpensive ink jet system.

2. Related Art

To package commodities such as sweets, a method is broadly performed in which a packaging outer box made of paper is covered with a transparent film, and the transparent film is partially or entirely printed so as to arrange a color image on a white background. An alternative method is also broadly performed in which the surface of a packaging bag member made of a plastic is printed so as to arrange the color image on the white background. In such printing, offset printing or flexo printing is usually employed.

In the printing industry, not only high quality in printing but also cost reduction in printed matters and shortening of the printing and delivering time are strictly demanded, and the use of digital data has advanced from decision of design to the start of actual printing by a printing machine. For example, in the work flow of the preparation of printed matters, the steps of the preparation of original data, calibration by direct digital color proofing (DDCP), the preparation of a plate by computer to plate (CTP) and actual printing by a printing machine advance in this order. Even during a DDCP calibrating operation performed to decide the original data, the digital data is frequently sent via electronic mail.

In the above DDCP calibrating operation, a person in charge of calibration or a person in charge of design ordering who has received the digital data via electronic mail not only performs a calibrating or confirming operation on a computer screen but also carries out the calibrating or confirming operation by actual printing on sheets. In this case, as an output system, an ink jet system, a toner system, a thermal transfer system, a dot system or the like is used. However, the printing performed so as to arrange the color image on the white background has a problem such that a satisfactory output quality level cannot necessarily be obtained by the most inexpensive ink jet system.

On the other hand, with a white ink for use in ink jet recording, the ink which contains therein hollow polymer fine particles has been proposed by (e.g., Japanese Patent No. 3562754 or Japanese Patent No. 3639479). However, until now it has not been proposed that the white ink containing these hollow polymer fine particles be used in the remote proofing by the ink jet system.

SUMMARY

The present inventor has intensively researched a novel method for obtaining a high-quality image by utilizing the ink let system to constitute an output system in a case where a printed matter (e.g., an offset printed matter) including the color image arranged on the white background is remote-proofed, and has come to a conclusion such that an intended purpose can be achieved by successively guiding a longitudinal film base material into two consecutive ink jet printers to individually record a pattern layer (especially, a color pattern layer) and a white overlaying layer.

The present invention is based on such development.

In accordance with one aspect of the present invention, there is provided an ink jet recording method in which a printing unit including a white overlaying layer and a non-white pattern layer is recorded on the surface of a longitudinal film base material by two liquid discharge means, the method including:

(A) providing the white overlaying layer by the first liquid discharge means in a case where the longitudinal film base material is opaque, and providing the non-white pattern layer on the dry white overlaying layer by the second liquid discharge means after the white overlaying layer has been dried;

(B) providing, in a case where the longitudinal film base material is transparent, the non-white pattern layer by the first liquid discharge means and providing the white overlaying layer on the dry non-white pattern layer by the second liquid discharge means after the non-white pattern layer has been dried; or (C) providing alternatively, in a case where the longitudinal film base material is transparent, the non-white pattern layer or the white overlaying layer on one surface of the longitudinal film base material by the first liquid discharge means and subsequently providing the white overlaying layer or the non-white pattern layer on the other surface of the longitudinal film base material in a position corresponding to the non-white pattern layer or the white overlaying layer by the second liquid discharge means.

In the method according to another aspect of the present invention, a plurality of printing units are successively recorded in a state where the printing units are disposed to be separated away from one another.

In the method according to a further aspect of the present invention, a position to be recorded by the second liquid discharge means is determined by a recording position confirmation mechanism.

In the method according to a still further aspect of the present invention, the non-white pattern layer is a color layer or a black or gray layer.

In the method according to a further aspect of the present invention, the white overlaying layer is provided to cover all over the whole non-white pattern layer provided on the surface of the transparent film base material.

In the method according to a furthermore aspect of the present invention, a white ink composition for the white overlaying layer contains hollow polymer fine particles or a porous inorganic pigment as a colorant.

In the method according to a still further aspect of the present invention, the longitudinal film base material having an ink reception layer is used.

The present invention also relates to a printed longitudinal matter obtained by the above-described method.

According to the recording method of an aspect of the present invention, high-quality printing can be obtained so that a color image is reflected on a clear white base, and there can be provided, for example, a printed matter which sufficiently satisfies a printing quality level demanded in a DDCP calibrating operation.

Moreover, in the recording method of an aspect of the present invention, one longitudinal film base material is consecutively guided into the two ink jet printers to print the white overlaying layer and the non-white pattern layer, respectively, so that the printing position of the white overlaying layer can precisely be brought into registration with that of the non-white pattern layer.

DESCRIPTION OF EXEMPLARY EMBODIMENTS

In a recording method of the present invention, a printing unit including a white overlaying layer and a non-white pattern layer is formed on the surface of a longitudinal film base material. Here, the non-white pattern layer forms the pattern portion of the resultant printed image, and the white overlaying layer forms a white background (a base color portion). Moreover, in the recording method of the present invention, both the white overlaying layer and the non-white pattern layer can be laminated to form the printing unit on one surface of the longitudinal film base material. In addition, when the longitudinal film base material is a transparent base material, one of the white overlaying layer and the non-white pattern layer may be formed on the one surface of the material, and the other layer of the non-white pattern layer and the white overlaying layer may be formed on the opposite-side surface of the material to form the printing unit. It is to be noted that in the following description, the former configuration is sometimes referred to as a "single-sided printing type", and the latter configuration is sometimes referred to as a "double-sided printing type".

In the present invention, as liquid discharge means, a head of an ink jet printer capable of discharging a fine liquid may be preferably employed.

Figure 1:
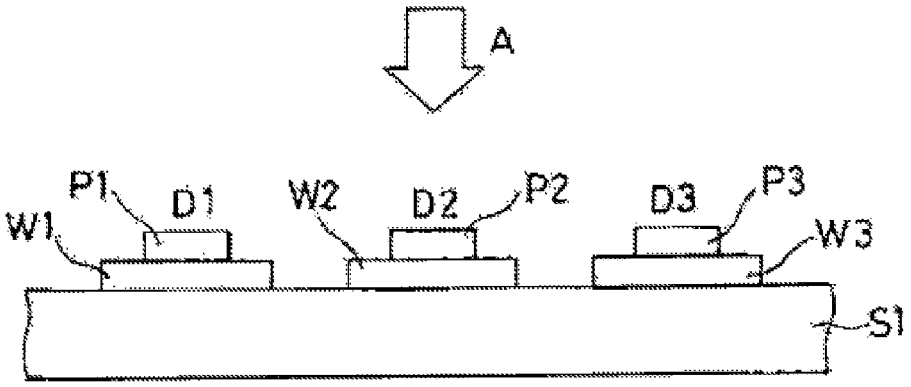
FIG. 1 is a sectional view schematically showing the layered structure of a printed image formed on a longitudinal film base material by a single-sided printing type recording method of the present invention.

In the single sided printing type recording method according to one embodiment of the present invention, as shown in, for example, FIG. 1, a plurality of printing units D1, D2 and D3 can continuously be formed on a longitudinal film base material S1 in a state in which the units are disposed away from one another. The printing unit D1 includes a white overlaying layer W1 and a non-white pattern layer P1 successively provided by an ink jet recording system. Here, the white overlaying layer W1 becomes a white background (a base color portion), and the non-white pattern layer P1 becomes a pattern portion. Similarly, the printing units D2, D3 include white overlaying layers W2, W3 and non-white pattern layers P2, P3, respectively. These printed images can be observed from the printed surface side of the longitudinal film base material S1 as shown by an arrow A of FIG. 1 to perform, for example, a DDCP calibrating operation.

Figure 2:
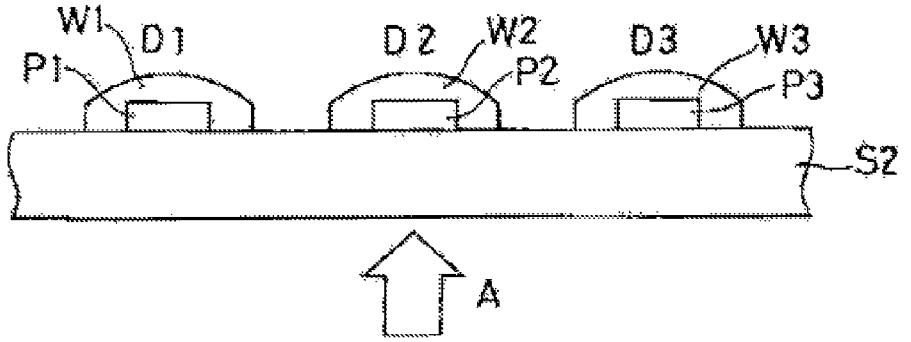
FIG. 2 is a sectional view schematically showing the layered structure of a printed image formed on a transparent longitudinal film base material by the single-sided printing type recording method of the present invention.

When the longitudinal film base material is constituted of a transparent material, as shown in, for example, FIG. 2, a plurality of printing units D1, D2 and D3 can continuously be formed on a longitudinal film base material 32 in a state in which the units are disposed away from one another. The printing unit D1 includes a non-white pattern layer P1 and a white overlaying layer W1 successively provided by the ink jet recording system. Here, the white overlaying layer W1 becomes a white background, and the non-white pattern layer P1 becomes a pattern portion. Similarly, the printing units D2, D3 include non-white pattern layers P2, P3 and white overlaying layers W2, W3, respectively. These printed images can be observed from the side opposite to the printed surface of the longitudinal film base material S2 as shown by an arrow A of FIG. 2 to perform, for example, the DDCP calibrating operation.

Figure 3:
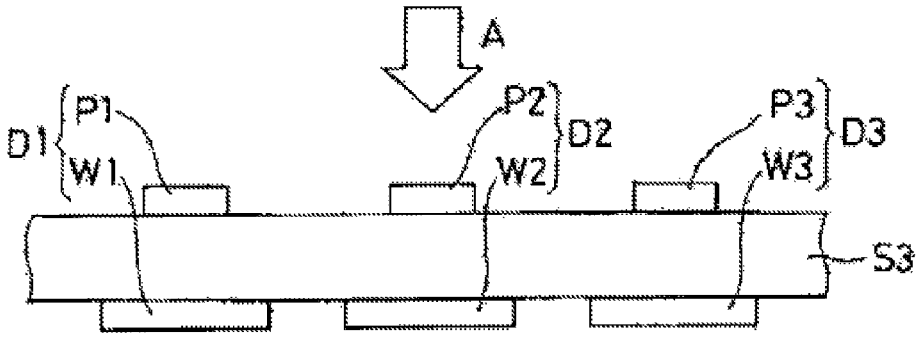
FIG. 3 is a sectional view schematically showing the layered structure of a printed image formed on a transparent longitudinal film base material by a double-sided printing type recording method of the present invention.

Furthermore, when the longitudinal film base material is constituted of a transparent material, as shown in, for example, FIG. 3, non-white pattern layers P1, P2 and P3 constituting pattern portions are formed on one surface of a longitudinal film base material S3. Similarly, white overlaying layers W1, W2 and W3 constituting white backgrounds (base color portions) are formed on the other surface of the material, whereby a plurality of printing units D1, D2 and D3 can continuously be formed in a state in which the units are disposed away from one another. These printed images can be observed from the printed-surface side of the non-white pattern layers P1, P2 and P3 of the transparent longitudinal film base material S3 as shown by an arrow A, of FIG. 3 to perform, for example, the DDCP calibrating operation.

Examples of a material for use as the film base material usable in the method of the present invention include a polyester film, a polyolefin film, a resin film of polyvinyl chloride or the like, plain paper, coated paper, tracing paper, paper coated with a resin and synthetic paper. Examples of a material for use as the transparent film base material include a polyester film, a polyolefin film, a resin film of polyvinyl chloride or the like, plain paper, coated paper, tracing paper, paper coated with a resin and synthetic paper.

The film base material preferably has an ink reception layer on the surface on which the printed image is to be formed. As the ink reception layer, a known ink reception layer usually provided on a recording medium for an ink jet recording method may be used. In a case where the film base material is constituted of a transparent material, the known ink reception layer usually provided on the recording medium for the ink jet recording method may be used as long as the material has transparency to such an extent that the observation from the non-printed-surface side of the transparent film base material is not disturbed.

Examples of the known ink reception layer is an ink reception layer made of a resin, and examples of the resin for use in the ink reception layer include various ink absorbing polymers such as a polyvinyl pyrrolidone or vinyl pyrrolidone-vinyl acetate copolymer disclosed in JP-A-57-38185, JP-A-62-184879; a resin composition mainly made of polyvinyl, alcohol disclosed in JP-A-60-168651, JP-A-60-171143 and JP-A-61-134290; a copolymer of vinyl alcohol, olefin or styrene and maleic anhydride disclosed in JP-A-60-234879; a crosslinked material of polyethylene oxide and isocyanate disclosed in JP-A-61-74879; a mixture of carboxymethyl cellulose and polyethylene oxide disclosed in JP-A-61-181679; a graft polymer of methacrylic amide with polyvinyl alcohol disclosed in JP-A-61-132377; an acrylic polymer having a carboxyl group as disclosed in JP-A-62-220383; a polyvinyl-acetal-based polymer disclosed in JP-A-4-214382 and the like; and a crosslinking acrylic polymer disclosed in JP-A-4-282282 and JP-A-4-285650.

Moreover, as the known ink reception layer, in JP-A-4-282282, JP-A-4-285650 and the like, the ink reception layer is disclosed in which a polymer matrix constituted of a crosslinking polymer and an absorbing polymer are used together. Furthermore, an ink reception layer using alumina hydrate (cationic alumina hydrate) is also known. For example, in JP-A-60-232990 and JP-A-60-245588, JP-B-3-24906 and JP-A-6-199035 and JP-A-7-82694, a recording medium is disclosed in which the surface of a base material is coated with a fine quasi-boehmite type alumina hydrate together with a water-soluble binder. Moreover, for example, in JP-A-10-203006, an ink reception layer is disclosed in which synthetic silica having primary particle diameters of 3 nm to 30 nm and prepared mainly by a gas phase process is used. Furthermore, in JP-A-2001-328344, an ink reception layer including an inorganic pigment and a polymer adhesive is disclosed.

In the method of the present invention, the film base material provided with any of the above ink reception layers can be used.

In the method of the present invention, as the white ink composition for the white overlaying layer, an arbitrary white ink composition usually for use in the ink jet recording method may be used. Examples of such a white pigment include an inorganic white pigment, an organic white pigment and white hollow polymer fine particles. As the white ink composition, an aqueous ink composition containing the hollow polymer fine particles as colorant components is preferably used.

Examples of the inorganic white pigment include alkaline earth metal sulfate such as barium sulfate, alkaline earth metal carbonate such as calcium carbonate, fine silicic acid powder, silica such as synthetic silicate, calcium silicate, alumina, alumina hydrate, titanium oxide, zinc oxide, talc and clay. In particular, titanium oxide is known as a white pigment which has preferable hiding properties, coloring properties and scattered particle diameters.

Examples of the organic white pigment include an organic compound salt disclosed in JP-A-11-129613 and an alkylene bis melamine derivative disclosed in JP-A-11-140365 and JP-A-2001-234093. Examples of the specific product of the above white pigment include Shigenox OWP, Shigenox OWPL, Shigenox FWP, Shigenox FWG, Shigenox UL and Shigenox U (they are trade names manufactured by Hakkoru Chemical Co.).

The hollow polymer fine particles contained as the colorant components are, for example, fine particles having outer diameters of about 0.1 to 1 μm and inner diameters of about 0.05 to 0.8 μm. The particles need to be insoluble in a solvent of the white ink composition, and it is necessary that the particles do not chemically react with another component such as a binder resin component.

The hollow polymer fine particles have walls formed of a synthetic polymer through which a liquid can pass, and the liquid can enter and exit from the central spaces of the hollow polymer fine particles through the walls thereof. Therefore, the central spaces of the hollow polymer fine particles are filled with a solvent in an ink composition state, the specific gravity of the hollow polymer fine particles becomes substantially equal to that of the ink composition, and the hollow polymer fine particles are stably scatted in the ink composition. On the other hand, when this ink composition is printed on the printing surface and dried, the central spaces of the hollow polymer fine particles are replaced with air. Therefore, incident light are diffusely reflected by the resin and a space part, to substantially exhibit a white color.

Moreover, as described above, the hollow polymer fine particles can be of such a type that the particles contain a liquid before printing. However, after the printing, the liquid which has entered the fine particles passes through the walls of the fine particles, and diffuses, and the fine pore; of the fine particles are filled with air. Alternatively, the particles can be of such a completely sealed type that the particles include air therein from the beginning.

It is demanded that the hollow polymer fine particles for use in the white ink composition should not be precipitated in the ink composition, and hence the particles preferably have a specific gravity substantially equal to that of an ink composition solution. Therefore, the specific gravity of the ink composition solution is preferably adjusted using a specific gravity regulator such as glycerol if necessary.

Examples of commercially available hollow polymer fine particles which satisfy the above properties include Ropaque OP-62 distributed by Rohm and Haas Co. This is an aqueous dispersant containing 38 wt % of hollow polymer fine particles formed of an acryl-styrene copolymer. The fine particles have inner diameters of about 0.3 μm and outer diameters of about 0.5 μm, and the particles are filled with water.

Moreover, the hollow polymer fine particles can be obtained by a known manufacturing method such as a method disclosed in U.S. Pat. No. 4,089,800. The hollow polymer fine particles are substantially made of an organic polymer, and exhibit thermal plasticity. Examples of a thermally plastic resin for use in manufacturing the hollow polymer fine particles preferably include a cellulose derivative, an acryl resin, polyolefin, polyamide, polycarbonate, polystyrene, a copolymer of styrene or another vinyl monomer, vinyl acetate, vinyl alcohol, a vinyl polymer such as a homo polymer or copolymer of vinyl chloride or vinyl butyral, and a homo polymer or copolymer of diene. Examples of the especially preferable thermoplastic polymer include a 2-hexyl acrylate copolymer, a copolymer of methyl methacrylate and a copolymer of styrene and another vinyl monomer such as acrylonitrile.

The content of the hollow polymer fine particles in the white ink composition for use in the method of the present invention can be set to, for example, 0.1 to 20 wt %. When the content of the hollow polymer fine particles is set to 0.1 wt % or more, a sufficient white degree can be obtained. On the other hand, when the content is set to 20 wt % or less, the sufficient amount of ink binder resin components necessary for securing the viscosity required for the ink composition for ink jet printing can be contained, and eventually sufficient printing close contact properties can be secured.

In the present invention, the above white pigments may be used alone or together. The pigments can be dispersed using a ball mill, a sand mill, an attritor, a roll mill, an agitator, Henschel mixer, a colloid mill, an ultrasonic homogenizer, a pearl mill, a wet type jet mill, a paint shaker or the like. When the pigments are dispersed, a dispersant may be added.

In addition to white colorant components, the white ink composition for use in the method of the present invention may contain various components usually contained in the ink composition for ink jet printing, for example, a resin component, a dispersant component, a solvent component (especially water) or the like. Moreover, as the white ink composition containing the hollow polymer fine particles as the white colorant, the composition disclosed in, for example, Japanese Patent No. 3562754 or Japanese Patent No. 3639479 may be used.

Examples of a non-white ink composition for the non-white pattern layer used in the method of the present invention include a color ink composition, a black ink composition, and a gray ink composition. Moreover, examples of the color ink composition include a cyan ink composition, a magenta ink composition, a yellow ink composition, a light cyan ink composition, a light magenta ink composition, a red ink composition, a green ink composition and a blue ink composition.

As the non-white ink composition, an arbitrary non-white ink composition usually used in the ink jet recording method may be used, and an aqueous ink composition containing a dye or a pigment as a colorant component is preferably used. In particular, it is preferable to use the ink composition which exhibits satisfactory properties (e.g., coloring and fixing properties) with respect to the transparent film base material or the ink reception layer.

In the single-sided printing type recording method of the present invention, when the longitudinal film base material is opaque, the white overlaying layer is first provided. After the layer is dried, the non-white pattern layer is printed. In this case, the resolution of the white overlaying layer can be set to a level equal to that of the resolution of the non-white pattern layer to perform the printing of both the layers. In addition, the printing of both the layers can be performed so that the resolution of the white overlaying layer becomes higher than that of the non-white pattern layer. The "resolution" in the printing (or a printer) according to the ink jet recording system is the number of dots (the number of ink droplets) per unit area. In the case of color printing, an intermediate color needs to be represented by a plurality of types of color ink droplets (dots). Therefore, in a case where the resolution is low, the amount of the ink (an ink discharge amount) per unit area needs to be decreased as compared with a case where the resolution is high. This is because the influence of ink bleeds needs to be considered. That is, in the case of the low resolution, the size of one ink droplet (dot) becomes larger than that of one ink droplet (dot) in the case of the high resolution. Therefore, the amount of the ink to be discharged needs to be decreased in order to prevent the generation of the ink bleed between the adjacent ink droplets (dots). On the other hand, in the case of the high resolution, the size of one ink droplet (dot) becomes smaller than that of the ink droplet (dot) in the case of the low resolution, and a problem such that the ink bleed between the adjacent ink droplets (dots) might take place decreases. A comparatively large amount of ink liquid can be discharged. Accordingly, in the single-sided printing type recording method of the present invention, in a case where the longitudinal film base material is opaque, when the resolution of the white overlaying layer is set to a resolution higher than that of the non-white pattern layer to perform the printing, the ink discharge amount per unit area of the white overlaying layer becomes larger than that per unit area of the non-white pattern layer. In consequence, the whole image becomes clear, and the high-quality image can be obtained. In this case, the resolution of the white overlaying layer is preferably 600 to 9600 dpi, and the resolution of the non-white pattern layer is preferably 180 to 1440 dpi, more preferably 360 to 720 dpi.

In a case where the opaque longitudinal film base material is subjected to the single-sided printing type recording method of the present invention, the printing of both the layers can be performed so that the resolution of the non-white pattern layer becomes higher than that of the white overlaying layer. When the resolution of the non-white pattern layer is set to a resolution higher than that of the white overlaying layer to perform the printing, the ink discharge amount per unit area of the white overlaying layer to be printed before the printing of the non-white pattern layer can be suppressed to a comparatively small level. Therefore, even when a highly concentrated region is present in the non-white pattern layer to be printed later, the total ink discharge amount per unit area does not exceed the amount allowed by the film base material, and the ink does not overflow. An appropriate-level printed matter can be obtained. In this case, the resolution of the white overlaying layer is preferably 180 to 1440 dpi, more preferably 360 to 720 dpi, and the resolution of the non-white pattern layer is preferably 600 to 9600 dpi.

Moreover, in a case where the opaque longitudinal film base material is subjected to the single-sided printing type recording method of the present invention, when the white overlaying layer containing a porous inorganic pigment is used, the white overlaying layer can exert a function as the ink reception layer with respect to the non-white pattern layer to be printed on the white overlaying layer. Therefore, even in a case where the white overlaying layer is printed in a high concentration and then the non-white pattern layer is printed in a higher concentration, the ink of the non-white pattern layer does not overflow the white overlaying layer. Thus, the high-quality printed matter having a highly concentrated color pattern on a thick white base can be obtained.

On the other hand, when the transparent longitudinal film base material is subjected to the single-sided printing type recording method of the present invention, the non-white pattern layer is first printed on one surface of the transparent film base material, and then the white overlaying layer is provided on the non-white pattern layer. Even in this case, the resolution of the white overlaying layer can be set to the level equal to that of the resolution of the non-white pattern layer to perform the printing of both the layers. In addition, both the layers can be printed so that the resolution of the white overlaying layer becomes higher than that of the non-white pattern layer. When the resolution of the white overlaying layer is set to a resolution higher than that of the non-white pattern layer to perform the printing, the ink discharge amount per unit area of the white overlaying layer becomes larger than that per unit area of the non-white pattern layer. Therefore, the whole image becomes clear, and the high-quality image can be obtained. In this case, the resolution of the white overlaying layer is preferably 600 to 9600 dpi, and the resolution of the non-white pattern layer is preferably 180 to 1440 dpi, more preferably 360 to 720 dpi.

Moreover, in a case where the transparent longitudinal film base material is subjected to the single-sided printing type recording method of the present invention, the printing of both the layers can be performed so that the resolution of the non-white pattern layer becomes higher than that of the white overlaying layer. When the resolution of the non-white pattern layer is set to a resolution higher than that of the white overlaying layer to perform the printing, the ink discharge amount per unit area of the white overlaying layer to be printed after the printing of the non-white pattern layer becomes comparatively small. Therefore, even when a highly concentrated region is present in the non-white pattern layer, the total ink discharge amount per unit area does not exceed the amount allowed by the transparent film base material, and the ink does not overflow. An appropriate-level printed matter can be obtained. In this case, the resolution of the white overlaying layer is preferably 180 to 1440 dpi, more preferably 360 to 720 dpi, and the resolution of the non-white pattern layer is preferably 600 to 9600 dpi.

Figure 4:
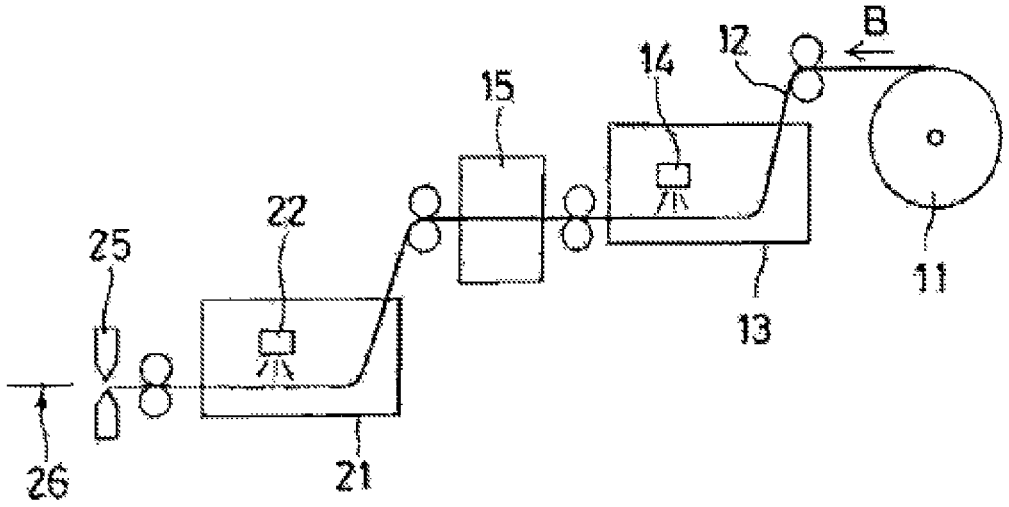
FIG. 4 is an explanatory view schematically showing the structure of a device suitable for performing the single-sided printing type recording method according to the present invention.

The single-sided printing type recording method of the present invention can be performed using, for example, a device shown in FIG. 4.

A longitudinal film base material 12 to be rewound and supplied from a roll 11 in the direction of an arrow B is guided into a first ink jet printer 13 by appropriate conveyance means. In the first ink jet printer 13, a white ink composition (or a non-white ink composition such as a color ink composition) is discharged from a printer head 14 to the surface of the longitudinal film base material 12 to form a white overlaying layer (or a non-white pattern layer). The longitudinal film base material 12 which carries the wet white overlaying layer (or non-white pattern layer) is guided into a drying chamber 15 by appropriate conveyance means, and the white overlaying layer (or the non-white pattern layer) is dried in the drying chamber 15. The longitudinal film base material 12 carrying the thus dried white overlaying layer (or the dried non-white pattern layer) is guided into a second ink jet printer 21 by appropriate conveyance means. In the second ink jet printer 21, a non-white ink composition (or a white ink composition) is discharged from a printer head 22 to the surface of the longitudinal film base material 12 above the dry white overlaying layer (or the dry non-white pattern layer), to form the non-white pattern layer (or the white overlaying layer). Thus, a printing unit including the white overlaying layer and the non-white pattern layer is continuously formed on one-side surface of the longitudinal film base material 12. Subsequently, the material is guided into cutting means 25 by appropriate conveyance means, and cut into regions each including the printing unit, whereby a desired printed matter 26 can be obtained. It is to be noted that instead of the cutting means 25, a wind-up roll may be provided, and the longitudinal material may be stored as it is until a cutting step is performed.

Figure 5:
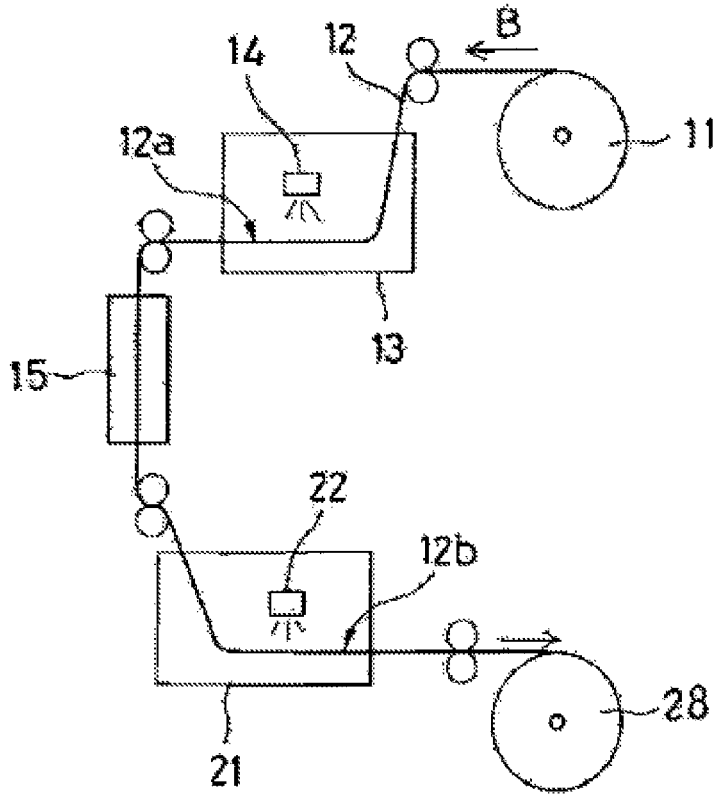
FIG. 5 is an explanatory view schematically showing the structure of a device suitable for performing the double-sided printing type recording method according to the present invention.

A double-sided printing type recording method according to the present invention can be performed using, for example, a device shown in FIG. 5.

A longitudinal film base material 12 to be rewound and supplied from a roll 11 in the direction of an arrow B is guided into a first ink jet printer 13 by appropriate conveyance means. In the first ink jet printer 13, a white ink composition (or a non-white ink composition such as a color ink composition) is discharged from a printer head 14 to one surface of the longitudinal film base material 12 to form a white overlaying layer (or a non-white pattern layer). The longitudinal film base material 12 which carries the wet white overlaying layer (or non-white pattern layer) is guided into a drying chamber 15 by appropriate conveyance means, and the white overlaying layer (or the non-white pattern layer) is dried in the drying chamber 15. The longitudinal film base material 12 carrying the thus dried white overlaying layer (or the dried non-white pattern layer) on one surface 12a is guided into a second ink jet printer 21 by appropriate conveyance means. In the second ink jet printer 21, a non-white ink composition (or a white ink composition) is discharged from a printer head 22 to the surface 12b opposite to the surface 12a carrying the dry white overlaying layer for the dry non-white pattern layer), to form the non-white pattern layer (or the white overlaying layer). Thus, a printing unit including the white overlaying layer and the non-white pattern layer is continuously formed on the both-side surfaces of the longitudinal film base material 12. Subsequently, the material is transported to a wind-up roll 28 by appropriate conveyance means, and the longitudinal material is stored as it is until a cutting step is performed. It is to be noted that instead of the wind-up roll 28, cutting means may be provided, and the material may be cut into regions each including the printing unit.

In the present invention, a drying step is performed between the printing performed by the first ink let printer and the printing performed by the second ink jet printer. In this drying step, arbitrary means capable of drying a recording layer formed by the first ink jet printer may be used, and the drying can be performed by, for example, heating, air drying or leaving to stand.

When the double-sided printing type recording method of the present invention is performed, the recording layer formed by the first ink jet printer and the recording layer formed by the second ink jet printer are provided on separate surfaces. Therefore, when the longitudinal film base material carrying the recording layer formed by the first ink jet printer is conveyed into the second ink jet printer, any drying step does not have to be performed as long as the recording layer is not influenced by the conveyance means.

In the present invention, a recording position confirmation mechanism is preferably used so that the position of the recording layer formed by the first ink jet printer and the position of the recording layer formed by the second ink jet printer are exactly adjusted. The recording position confirmation mechanism includes a positional mark provided on the surface of the longitudinal film base material, a detection sensor which detects the positional mark, and control means for discharging ink droplets from the printer head of the second ink jet printer to the printing position of the longitudinal film base material in accordance with a signal from the detection sensor.

The positional mark may be provided on the surface of the longitudinal film base material by the first ink jet printer. In this case, the positional mark is preferably associated with the position of the recording layer formed by the first ink jet printer, and formed. Instead of forming the positional mark by the first ink jet printer, the longitudinal film base material already provided with the positional mark may be used. In this case, the recording layer is formed by the first ink jet printer in association with the positional mark on the longitudinal film base material, and then the recording layer may be formed by the second ink jet printer.

The method of the present invention can preferably be used in a case where printing is actually performed on sheets to perform calibrating and confirming during the remote proofing of a printed matter (e.g., an offset printed matter) including a color image arranged on a white base. Moreover, in general, the printed matter including the color image arranged on the white base is provided on the surface of the transparent film base material, and broadly used in a printing method for observing the printed matter from a non-printed surface.

EXAMPLE

The present invention will hereinafter specifically be described in accordance with an example, but the example does not restrict the scope of the present invention.

As output machines, two ink jet printeks PX7500 [manufactured by SEIKO EPSON CORPORATION] were prepared and vertically arranged. The upper ink jet printer was used for color printing, and the lower ink jet printer was used for white output. The upper ink jet printer was provided with a pure color ink cartridge, and a white ink cartridge was inserted into a cartridge for black ink in the lower ink jet printer. As white ink, the white ink disclosed in Example 8 of Japanese Patent No. 3639479 was used. In a recording medium, a transparent film [manufactured by SEIKO EPSON CORPORATION] for ink jet wound around a roll was used.

First, usual color printing was performed by the upper ink jet printer, and the roll distal end of the printer was connected as it was to the lower ink jet printer to confirm that a printed color recording layer had dried. Afterward, the white ink was output. When the color printing was performed by the upper ink jet printer, a pattern for position confirmation was recorded in a portion corresponding to the upper left portion of an image. In the lower ink jet printer, a position confirmation sensor was provided in a head carriage portion, and the position confirmation pattern recorded during color output was read. Then, the output position of the white output was recognized, and white overlaying output was performed.

According to the method of the present invention, for example, remote proofing during package printing of such a type that a color image is printed on a white base can precisely be realized by an inexpensive ink jet system.

What is claimed is:

[1. A recording method in which a printing image including a white ink layer and a non-white ink layer is recorded to a recording medium, the method comprising:

providing, in a case where the recording medium is opaque, the white ink layer and providing the non-white ink layer on the white ink layer;

wherein a resolution of the white ink layer is higher than a resolution of the non-white ink layer; and wherein an ink discharge amount per unit area of the white ink layer is larger than an ink discharge amount per unit area of the non-white ink layer.]

[2. The method according to claim 1, further comprising drying the white ink, the non-white ink layer being provided after the drying.]

[3. The method according to claim 1 wherein the resolution per unit inch of the white ink layer is 600 to 9600 dpi, and the resolution per unit inch of the non-white ink layer is 180 to 1440 dpi.]

[4. The method according to claim 1, wherein a size of white ink droplets discharged for recording the white ink layer is either larger or smaller than non-white ink droplets discharged for recording the non-white ink layer.]

[5. The method according to claim 1, wherein the non-white ink layer is a color layer, a black layer, or a gray layer.]

[6. A recording method in which a printing image including a white ink layer and a non-white ink layer is recorded to a recording medium, the method comprising:

providing, in a case where the recording medium is transparent, the non-white ink layer and providing the white ink layer to the white ink layer;

wherein a resolution of the white ink layer is higher than a resolution of the non-white ink layer; and wherein an ink discharge amount per unit area of the white ink layer is larger than an ink discharge amount per unit area of the non-white ink layer.]

[7. The method according to claim 6, further comprising drying the non-white ink, the white ink layer being provided after the drying.]

[8. The method according to claim 6, wherein the resolution per unit inch of the white ink layer is 600 to 9600 dpi, and the resolution per unit inch of the non-white ink layer is 180 to 1440 dpi.]

[9. The method according to claim 6, wherein a size of white ink droplets discharged for recording the white ink layer is either larger or smaller than non-white ink droplets discharged for recording the non-white ink layer.]

[10. The method according to claim 6, wherein the non-white ink layer is a color layer, a black layer, or a gray layer.]

*11. A recording method in which a printing image including a white ink layer and a non-white ink layer is recorded to a recording medium, the method comprising:*

*providing, in a case where the recording medium is opaque, the white ink layer and providing the non-white ink layer on the white ink layer;*

*wherein a resolution of the white ink layer is higher than a resolution of the non-white ink layer, the resolution of the white ink layer being the number of ink droplets of a white ink per unit area in a region where the white ink layer is provided on the non-white ink layer, and the resolution of the non-white ink layer being the number of ink droplets of a non-white ink per unit area in the region; and*

*wherein an ink discharge amount per unit area of the white ink layer is larger than an ink discharge amount per unit area of the non-white ink layer, the ink discharge amount per unit area of the white ink layer being the discharge amount of the white ink per unit area in the region where the white ink layer is provided on the non-white ink layer, and the ink discharge amount of the non-white ink layer being the discharge amount of the non-white ink per unit area in the region.*

*12. The method according to claim 11, further comprising drying the white ink, the non-white ink layer being provided after the drying.*

*13. The method according to claim 11, wherein the resolution per unit inch of the white ink layer is 600 to 9600 dpi, and the resolution per unit inch of the non-white ink layer is 180 to 1440 dpi.*

*14. The method according to claim 11, wherein a size of white ink droplets discharged for recording the white ink*

*layer is either larger or smaller than non-white ink droplets discharged for recording the non-white ink layer.*

*15. The method according to claim 11, wherein the non-white ink layer is a color layer, a black layer, or a gray layer.*

*16. A recording method in which a printing image including a white ink layer and a non-white ink layer is recorded to a recording medium, the method comprising:*

*providing, in a case where the recording medium is transparent, the non-white ink layer and providing the white ink layer to the non-white ink layer;*

*wherein a resolution of the white ink layer is higher than a resolution of the non-white ink layer, the resolution of the white ink layer being the number of ink droplets of a white ink per unit area in a region where the white ink layer is provided on the non-white ink layer, and the resolution of the non-white ink layer being the number of ink droplets of a non-white ink per unit area in the region; and*

*wherein an ink discharge amount per unit area of the white ink layer is larger than an ink discharge amount per unit area of the non-white ink layer, the ink discharge amount per unit area of the white ink layer being the discharge amount of the white ink per unit area in the region where the white ink layer is provided on the non-white ink layer, and the ink discharge amount of the non-white ink layer being the discharge amount of the non-white ink per unit area in the region.*

*17. The method according to claim 16, further comprising drying the non-white ink, the white ink layer being provided after the drying.*

*18. The method according to claim 16, wherein the resolution per unit inch of the white ink layer is 600 to 9600 dpi, and the resolution per unit inch of the non-white ink layer is 180 to 1440 dpi.*

*19. The method according to claim 16, wherein a size of white ink droplets discharged for recording the white ink layer is either larger or smaller than non-white ink droplets discharged for recording the non-white ink layer.*

*20. The method according to claim 16, wherein the non-white ink layer is a color layer, a black layer, or a gray layer.*

* * * * *